United States Patent
Itabashi

(10) Patent No.: US 7,103,472 B2
(45) Date of Patent: Sep. 5, 2006

(54) INFORMATION TERMINAL APPARATUS, NAVIGATION SYSTEM, INFORMATION PROCESSING METHOD, AND COMPUTER PROGRAM

(75) Inventor: Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 10/761,563

(22) Filed: Jan. 21, 2004

(65) Prior Publication Data

US 2004/0210382 A1    Oct. 21, 2004

(30) Foreign Application Priority Data

Jan. 21, 2003  (JP)  ............. P2003-011884

(51) Int. Cl.
G01C 21/26 (2006.01)
G08G 1/123 (2006.01)

(52) U.S. Cl. .................. 701/200; 701/213; 340/988

(58) Field of Classification Search ........ 701/200–216; 340/988–996
See application file for complete search history.

(56) References Cited

U.S. PATENT DOCUMENTS

| | | | | |
|---|---|---|---|---|
| 6,377,210 B1 * | 4/2002 | Moore | ................. | 342/357.13 |
| 6,604,049 B1 * | 8/2003 | Yokota | ................. | 701/213 |
| 6,912,462 B1 * | 6/2005 | Ogaki | ................. | 701/208 |
| 2002/0128770 A1 * | 9/2002 | Ooishi | ................. | 701/207 |
| 2004/0010367 A1 * | 1/2004 | Pollard | ................. | 701/211 |
| 2004/0260458 A1 * | 12/2004 | Park et al. | ................. | 701/200 |

FOREIGN PATENT DOCUMENTS

| | | |
|---|---|---|
| JP | 61-095386 | 5/1986 |
| JP | 62-212776 | 9/1987 |
| JP | 05-240724 | 9/1993 |
| JP | 07-286854 | 10/1995 |
| JP | 07-306054 | 11/1995 |
| JP | 09-259385 | 10/1997 |
| JP | 11-211499 | 8/1999 |

OTHER PUBLICATIONS http://www.icot.or.jp/FTS/REPORTS/H9-reports/H9-HCIS/AITEC9805R1-ch1-303.htm#anchor-ch3-3-e, Japanese Language website.

* cited by examiner

Primary Examiner—Matthew Luu
(74) Attorney, Agent, or Firm—Bell, Boyd & Lloyd LLC

(57) ABSTRACT

A configuration is provided which allows users, such as children, who cannot sufficiently read map information to easily perform positional confirmation. An information terminal apparatus carried on a user includes an image data storage block storing actually taken image data of two or more geographical points in an area in which positional information is to be provided and a positional information database storing the correlation data between the identifiers of image data stored in the image data storage block and the positional information. On the basis of the positional information obtained from a positional information capture block, the image data identifier corresponding to the positional information is obtained from the positional information database, the actually taken image data are obtained from the image data storage block based on the obtained image data identifier, and the obtained actually taken image data are displayed on a display block. This novel configuration allows the user to instantly determine the actually taken video which matches the surrounding view for easy positional confirmation.

5 Claims, 12 Drawing Sheets

FIG. 2

| LONGITUDE/LATITUDE | IMAGE DATA |
|---|---|
| 47, 35, 52/63, 32, 35 | file5639w.jpg, file3825e.jpg, file4327n.gif·· |
| ·· | ·· |
| 47, 35, 52/63, 32, 35 | file5639n.jpg, file3825s.jpg, file4327w.gif·· |

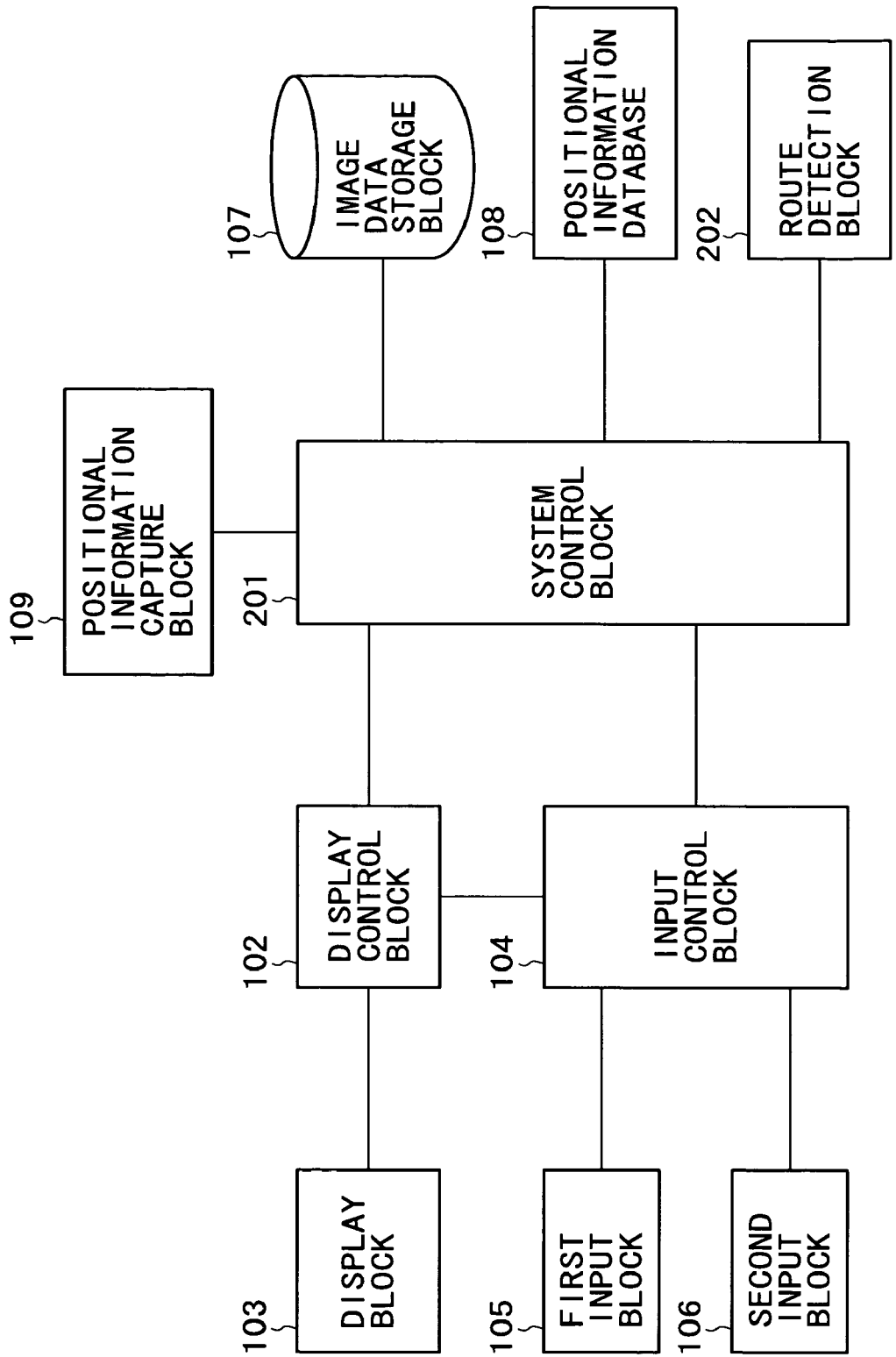

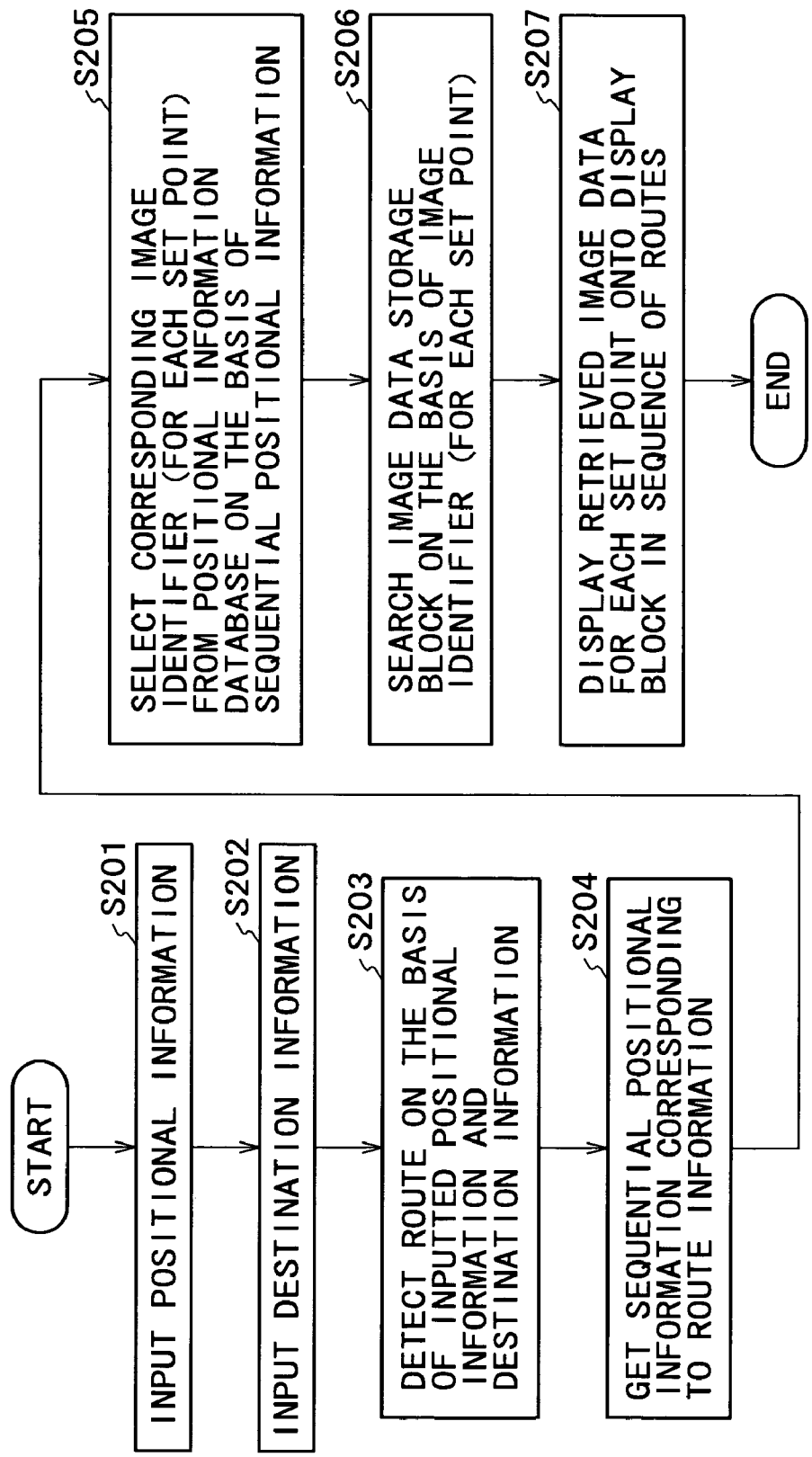

INFORMATION TERMINAL APPARATUS, NAVIGATION SYSTEM, INFORMATION PROCESSING METHOD, AND COMPUTER PROGRAM

BACKGROUND OF THE INVENTION

The present invention relates generally to an information terminal apparatus, a navigation system, an information processing method, and a computer program and, more particularly, to an information terminal apparatus, a navigation system, an information processing method, and a computer program which allow users such as children who do not have enough knowledge for correctly reading maps to instantly understand their current positions, and present, on terminals having limited display capabilities as with mobile terminals, such information essential to users as the directions in which users are heading for example.

Recently, portable personal computers and mobile phones have become widespread, allowing their users to carry these devices on them for outdoor or on-the-way communication through networks. In this so-called mobile computing environment, the number of service modes available for these users through networks is quickly increasing.

One of these service modes is the provision of navigation information. This service started with the provision of mainly the map information for cars; currently, services for presenting the information about users' current locations and the maps leading to destinations are provided for not only in-vehicle navigation systems but also mobile communication terminals such as mobile phones and PDAs which users carry on them.

The GPS (Global Positioning System) is known as a system for detecting the position of an in-vehicle navigation system or a user-carried mobile terminal for example. A terminal having these position detecting capabilities also allows the detection of a direction in which the user is heading and the selection of map information to be presented on the user terminal as well as the setting of the direction of the presentation.

A system for detecting user positions by the GPS and providing optimum navigation information is disclosed in non-patent document 1 shown below. The system disclosed in this document is called Walk Navi which is constituted by a mobile system for performing positional recognition, voice interaction, information display, and mobile communication and a geographic WWW (World Wide Web) server for relating positional information (latitude/longitude) with URLs (Uniform Resource Locators) of WWW.

Non-patent document 1 proposes a position recognition processing configuration in which an area where a user is currently positioned is computed from the latitude/longitude information obtained by the GPS and an electronic map, a voice interaction system configuration which provides high convenience in inputting information while a user is walking, and a geographic WWW server configuration in which latitude/longitude (or address) information is related with URLs.

As described above, a variety of navigation systems have been proposed or commercialized so far, but many of current navigation information providing services are limited to the presentation of two-dimensional map information. Namely, these services display maps represented in two-dimensional vector information or bitmap information onto user terminals. These kinds of two-dimensional map information are often difficult to recognize on portable terminals having limited display capabilities. Besides, for such users who cannot understand how to read maps as children, these kinds of two-dimensional map information avail nothing.

[Non-patent document 1]

Author: Katashi Nagao, Member of Committee, Research Working Group

Title: Agent Augmented Reality; Integration of the Real World with the Cyberspace by Agent Associated portion (page, column, line, etc.): 3.3.6.2 Walk Navi (pedestrian navigator)

Media type: Online

Date of publishing: March, 1998

Publisher: Advanced Information Technology (AITEC), Japan Information Processing Development Corporation (JIPDEC)

Address: Fourth floor, Shiba Tokyo Kaijo Building, 2-3-3 Shiba, Minatoku, Tokyo

Phone: 03-3456-2511

Page of publishing such as place of publishing: Trace the following link from http://www.icot.or.jp-Research research report:

1997

H9-8: Material, Researches into the intellectual information technology based on human being (March, 1998)

To the table of contents

3 Technological Problems to Be Solved and Research Scenario 3.3 Agent augmented reality—Integration of the Real World with the Cyberspace by Agent Date of search: Nov. 21, 2002

Source, Address: http://www.icot.or.jp/FTS/REPORTS/H9-reports/H9-HCIS/AITEC 9805R1-ch1-303.htm#anchor-ch3-3-e

SUMMARY OF THE INVENTION

It is, therefore, an object of the present invention to provide an information terminal apparatus, a navigation system, an information processing method, and a computer program which allow users, such as children, who do not have enough knowledge for correctly reading maps to instantly understand their current positions by presenting, in the provision of navigation information, not two-dimensional map information but actually "taken" image data such as views and buildings observable from users' current positions or three-dimensional information. These present, on terminals having limited display capabilities as with mobile phones, such information essential to users as the directions in which users are heading, for example.

In carrying out the invention and according to a first embodiment thereof, there is provided an information terminal apparatus for providing positional information, which includes: an image data storage block storing actually taken image data of a number of geographic points in an area for which positional information is provided; a positional information database storing correlation data between an identifier of image data stored in the image data storage block and positional information; a positional information capture block for capturing a position of an information terminal apparatus; a control block for executing processing of obtaining, on the basis of positional information obtained from the positional information capture block, an image data identifier corresponding to the positional information from the positional information database and, on the basis of the obtained image data identifier, obtaining actually taken image data from the image data storage block; and a display block for displaying the actually taken image data obtained by the control block.

In the above-mentioned information terminal apparatus, the actually taken image data stored in the image data storage block are actually taken panoramic images corresponding to the positional information, and the information terminal apparatus has an input block through which a display area for a panoramic image displayed on the display block is changed.

In the above-mentioned information terminal apparatus, the actually taken image data stored in the image data storage block are actually taken image data in a number of directions corresponding to the positional information, the control block executes processing of outputting a number of actually taken image data corresponding to the positional information to the display block on the basis of a position of the information terminal apparatus, and the information terminal apparatus has an input block for executing processing of selectively displaying the actually taken image data in the number of directions displayed on the display block.

The above-mentioned information terminal apparatus may also include: a route detection block for executing route search processing on the basis of a current position and a destination. On the basis of a number of pieces of positional information along a route based on route information obtained by entering a current position and a destination from the route detection block, the control block executes processing of obtaining a number of image data identifiers corresponding to a number of pieces of positional information from the positional information database, obtaining a number of actually taken image data along a route from the image data storage block on the basis of the obtained number of image data identifiers, and displaying the number of actually taken image data along a route onto the display block in one of a sequential parallel manner and a sequential manner.

In the above-mentioned information terminal apparatus, the positional information capture block executes processing of obtaining latitude and longitude information of the information terminal apparatus. The positional information database stores correlation data between an identifier of image data stored in the image data storage block and the latitude and longitude information as positional information. The control block, on the basis of the latitude and longitude information obtained from the positional information capture block, executes processing of obtaining an image data identifier corresponding to the latitude and longitude information from the positional information database.

In carrying out the present invention and according to a second embodiment thereof, there is provided a navigation system for providing positional information through a network, which includes: a server for providing positional information, an information terminal apparatus for receiving positional information, and a base station for executing communication and relay processing between the server and the information terminal apparatus. The server has an image data storage block storing actually taken image data at a number of geographic points in an area for which positional information is provided, a positional information database storing correlation data between an identifier of image data stored in the image data storage block and positional information, and a file selection block for executing processing of obtaining, on the basis of positional information received through the base station, an image data identifier corresponding to the positional information from the positional information database and obtaining actually taken image data from the image data storage block on the basis of the obtained image data identifier. The base station has a regional information management block for managing information including the positional information of itself and, on the basis of an inquiry for a position from the information terminal apparatus, executing processing of transmitting positional information stored in the regional information management block to the server. The information terminal apparatus has a communication block for transmitting a positional inquiry to the base station and receiving actually taken image data obtained on the basis of the positional information in the server and a display block for displaying the actually taken image data.

In the above-mentioned navigation system, the actually taken image data stored in the image data storage block of the server are actually taken panoramic images corresponding to the positional information, and the information terminal apparatus has an input block through which processing of changing a display area of the panoramic image displayed on the display block.

In the above-mentioned navigation system, the actually taken image data stored in the image data storage block of the server are actually taken image data in a number of directions corresponding to the positional information. The file selection block executes, on the basis of positional information, processing of selecting a number of actually taken image data corresponding to the positional information. The information terminal apparatus has an input block through which the actually taken image data in the number of directions to be displayed on the display block are selectively displayed.

In the above-mentioned navigation system, the server further has a route detection block for executing route search processing. The file detection block of the server executes, on the basis of a number of pieces of positional information along a route based on route information obtained from the route detection block, processing of obtaining a number of image data identifiers corresponding to the number of pieces of positional information from the positional information database, obtaining a number of actually taken image data along a route from the image data storage block on the basis of the obtained number of image data identifiers, and generating data for displaying the number of actually taken image data along a route in one of a sequential parallel manner and a sequential manner.

In the above-mentioned navigation system, the regional information management block of the base station stores latitude and longitude information itself. The positional information database of the server stores correlation data between an image data identifier stored in the image data storage block and the latitude and longitude information as positional information. The file selection block executes, on the basis of the latitude and longitude information obtained from the base station, processing of obtaining the image data identifier corresponding to the latitude and longitude information from the positional information database.

In carrying out the present invention and according to a third plurality thereof, there is provided an information processing method for displaying positional information on an information terminal apparatus, which includes the steps of: obtaining a position of the information terminal apparatus; on the basis of the obtained positional information, searching a positional information database storing correlation data between an identifier of image data stored in an image data storage block and positional information to retrieve an image data identifier corresponding to the positional information; on the basis of the retrieved image data identifier, obtaining actually taken image data from an image data storage block storing actually taken image data at a number of geographic points in an area for which positional information is provided; and displaying the obtained actually taken image data.

The above-mentioned information processing method may further include the steps of: detecting a route on the basis of a current position and a destination; on the basis of a number of pieces of positional information along a route based on route information obtained in the route detection step, obtaining a number of image data identifiers corresponding to a number of pieces of positional information from the positional information database and, on the basis of the number of obtained image data identifiers, obtaining a number of actually taken image data along a route from the image data storage block; and displaying the number of actually taken image data along a route in one of a sequential parallel manner and a sequential manner.

In carrying out the present invention and according to a fourth embodiment thereof, there is provided a computer program coded for executing, on a computer system, information processing for displaying positional information on an information terminal apparatus, including the steps of: obtaining a position of the information terminal apparatus; on the basis of the obtained positional information, searching a positional information database storing correlation data between an identifier of image data stored in an image data storage block and positional information to retrieve an image data identifier corresponding to the positional information; on the basis of the retrieved image data identifier, obtaining actually taken image data from an image data storage block storing actually taken image data at a number of geographic points in an area for which positional information is provided; and displaying the obtained actually taken image data.

According to one configuration of the present invention, an information terminal apparatus which can be carried on a user includes an image data storage block storing actually taken image data of two or more geographical points in an area for which positional information is provided and a positional information database storing the correlation data between the identifiers of image data stored in the image data storage block and the positional information. On the basis of the positional information obtained from a positional information capture block, the image data identifier corresponding to the positional information is obtained from the positional information database, the actually taken image data are obtained from the image data storage block based on the obtained image data identifier, and the obtained actually taken image data are displayed on a display block. This novel configuration allows the user to instantly determine the actually taken video which matches the surrounding view, thereby allowing such users as children who cannot sufficiently read map information to easily perform positional confirmation.

In the route information display capability according to the present invention, two or more image data identifiers corresponding to two or more pieces of positional information are obtained from the positional information database on the basis of two or more pieces of positional information along the route based on the route information which is obtained by inputting current position and destination information, two or more actually taken image data along the route are obtained from the image data storage block on the basis of the obtained two or more image data identifiers, and the obtained two or more actually taken image data along the route are displayed sequentially all in one screen or sequentially at different times. This novel configuration allows the user to reach each destination only by advancing in the direction in which a presented image matches an actual view in front, thereby allowing such users as children who cannot sufficiently read map information to perform correct route selection for easy arrival at destination.

According to another configuration of the present invention, a server includes an image data storage block storing actually taken image data of two or more geographic points and a positional information database storing correlation data between the identifiers of image data stored in the image data storage block and the positional information. On the basis of the positional information of a base station, actually taken image data are provided to the user's information terminal apparatus. This novel configuration allows the user terminal not to require the capabilities of acquiring positional information and image data, thereby providing quality navigation information by use of small-size and low-cost communication terminals.

The computer program according to the present invention may be provided to general-purpose computer systems capable of executing various program codes from computer-readable storage media such as CD, FD, and MO and communication media such as networks. Provision of this computer program in a computer-readable form effects various processing operations in accordance with the program on the above-mentioned computer systems.

The above and other objects and features of the invention will appear more fully hereinafter from a consideration of the following Detailed Description of the Invention taken in connection with the accompanying Figures. It should be noted that term "system" as used herein denotes a logical aggregate of a number of apparatuses and devices, and they are not always accommodated in one housing.

BRIEF DESCRIPTION OF THE DRAWINGS

FIG. 2 shows an exemplary configuration of data stored in a positional information database.

FIG. 5 is a block diagram illustrating an information terminal apparatus practiced as Embodiment 2 of the present invention.

FIG. 7 is a flowchart for describing a processing procedure of the information terminal apparatus practiced as Embodiment 2.

DETAILED DESCRIPTION OF THE PRESENT INVENTION

EMBODIMENT 1

An information terminal apparatus according to Embodiment 1, that is a configuration of an information terminal apparatus which is employed in a mobile phone or transport vehicles such as cars by a user and displays navigation information will be described in further detail, by way of example, with reference to FIG. 1.

Figure 1:
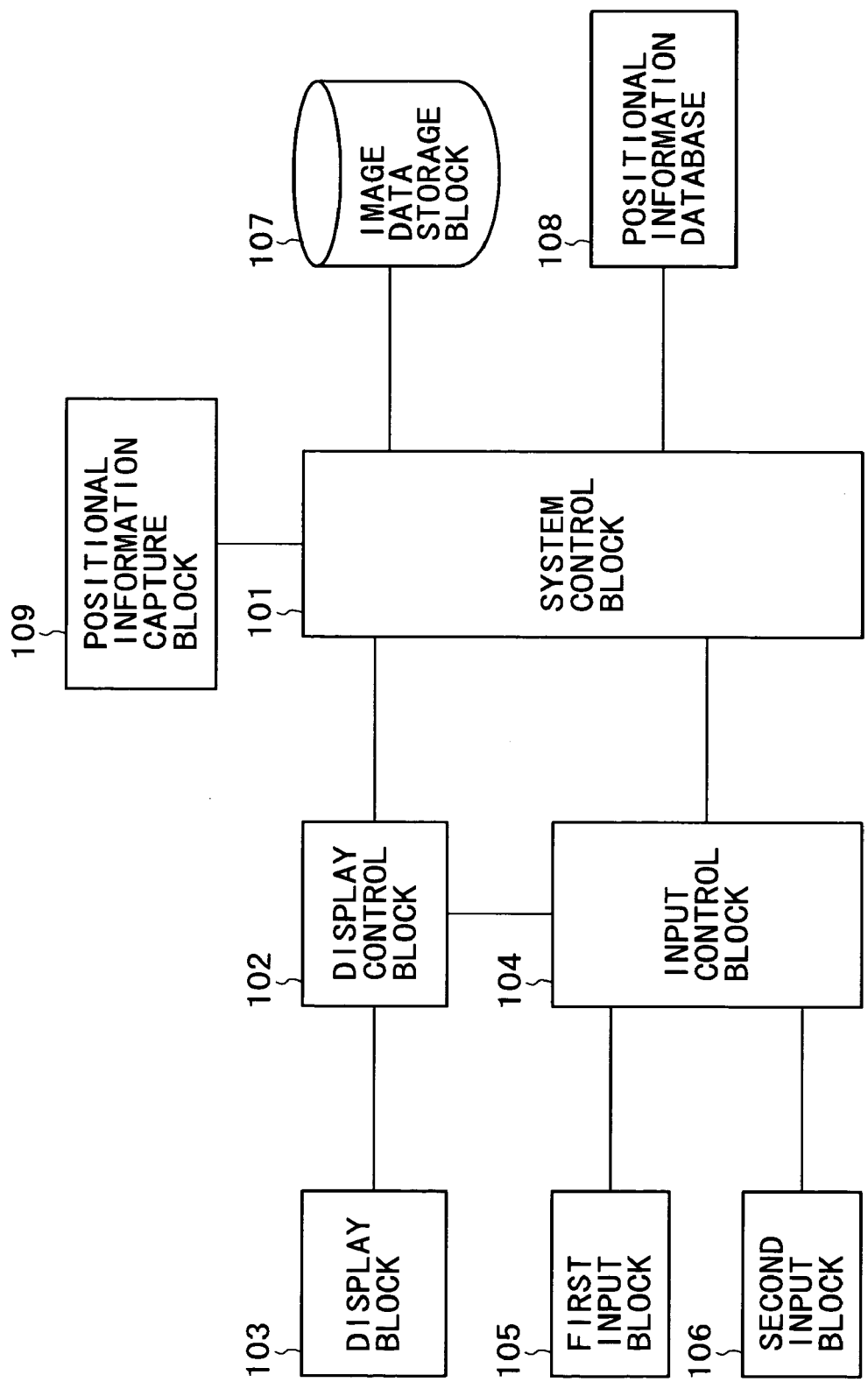
FIG. 1 is a block diagram illustrating a configuration of an information terminal apparatus practiced as Embodiment 1 of the present invention.

As shown in FIG. 1, the information terminal apparatus has a system control block 101 for controlling the entire system, a display control block 102 for controlling the data output to a display block 103, the display block 103 based on a display device such as LCD or CRT, a first input block 105 composed of a switch, a button, a dial, and a mouse, for example, a second input block 106, an input control block 104 for controlling the data input from an associated device of the input block, an image data storage block 107 for storing images of buildings, roads, and views such as two-dimensional or three-dimensional photographic information, a positional information database 108 storing correlation data between a variety of pieces of photographic information stored in the image data storage block 107 and latitude/longitude information, and a positional information capture block 109 for capturing positional information from the outside. The image data storage block 107 stores the actually taken image data of a number of geographical points in an area for which positional information is provided.

The system control block 101 executes the processing of selecting the data to be displayed on the display control block 102 which executes the display control of the display block 103; namely, the photographic information stored in the image data storage block 107. The information to be displayed on the display block 103 is the photographic information associated with two-dimensional or three-dimensional buildings, roads, and views, for example, stored in the image data storage block 107.

The display information displayed on the display block 103 may be zoomed in or out. If a provided image file is a panoramic image having a field angle of 360 degrees, the selection of display areas is enabled. In accordance with the input made through the first input block 105, display images may be changed. For example, the first input block 105 is constituted by a rocker switch. When this rocker switch is pressed to one side, an image moves to one side and, when this rocker switch is held in that side, the contents of display cycle to return to the original position. The first input block 105 is used when specifying a display area for the actually taken image data displayed on the display block 103 and executing a zoom-in operation as the processing for enlarging display and a zoom-out operation as the processing for shrinking display.

The input information including user input information supplied through the first input block 105, for example, input information including the specification of zoom-in or zoom-out and area specification information, is received by the system control block 101 via the input control block 104 and the system control block 101 outputs a processing command for zoom-in or zoom-out and information specifying an area to be processed to the display control block 102 where the image data displayed on the display block 103 are controlled.

The second input block 106 is operated when starting the use of the navigation capability, entering an end command, and fixing display information; namely, entering various information associated with the switching between display images, determination processing and the like.

The positional information capture block 109 is constituted as a device for receiving data from a signal (namely, a beacon) for sending positional coordinates and road traffic information through an antenna block installed on a road, for example. It should be noted that the beacon was developed as a component for use mainly in automobile information providing systems and a radio beacon and an optical beacon have been put in practical use. Alternatively, the positional information capture block 109 may be configured to execute the processing of receiving positional information (latitude/longitude) based on the GPS.

The system control block 101 gets positional information (latitude/longitude) through the positional information capture block 109 and searches the positional information database 108 on the basis of the input positional information (latitude/longitude).

The positional information database 108 stores correlation data between the various photographic information stored in the image data storage block 107 and latitude/longitude data. FIG. 2 shows an exemplary configuration of the data stored in the positional information database 108.

As shown in FIG. 2, the positional information database 108 stores individual latitude/longitude information and the identification information for identifying various photographic information stored in the image data storage block 107, the photographic information corresponding to the latitude/longitude information. For the identification information, a file name such as file name "xxxxn.jpg" is stored and the system control block gets positional information (latitude/longitude information) via the positional information capture block 109, searches the positional information database 108 on the basis of the inputted positional information (latitude/longitude information) to identify an image file name to be displayed, searches the positional information database 108 on the basis of the retrieved image file name, and outputs the retrieved image to the display control block 102. If the image data are JPEG compressed data, the display control block 102 decompresses the image data before supplying them to the display block 103.

In the configuration of the positional information database shown in FIG. 2, a number of image data file identifiers are stored for one piece of latitude/longitude information. These identifiers include actually taken image data associated with the North, the South, the East, and the West (NSEW) in the same positional information or the actually taken image data set around a particular landmark, for example. File identifiers n, w, e, s shown in FIG. 2 are usable as identification data indicative of orientation. These pieces of information are also usable in the extraction of actually taken image data in the route search of Embodiment 2.

Figure 3:
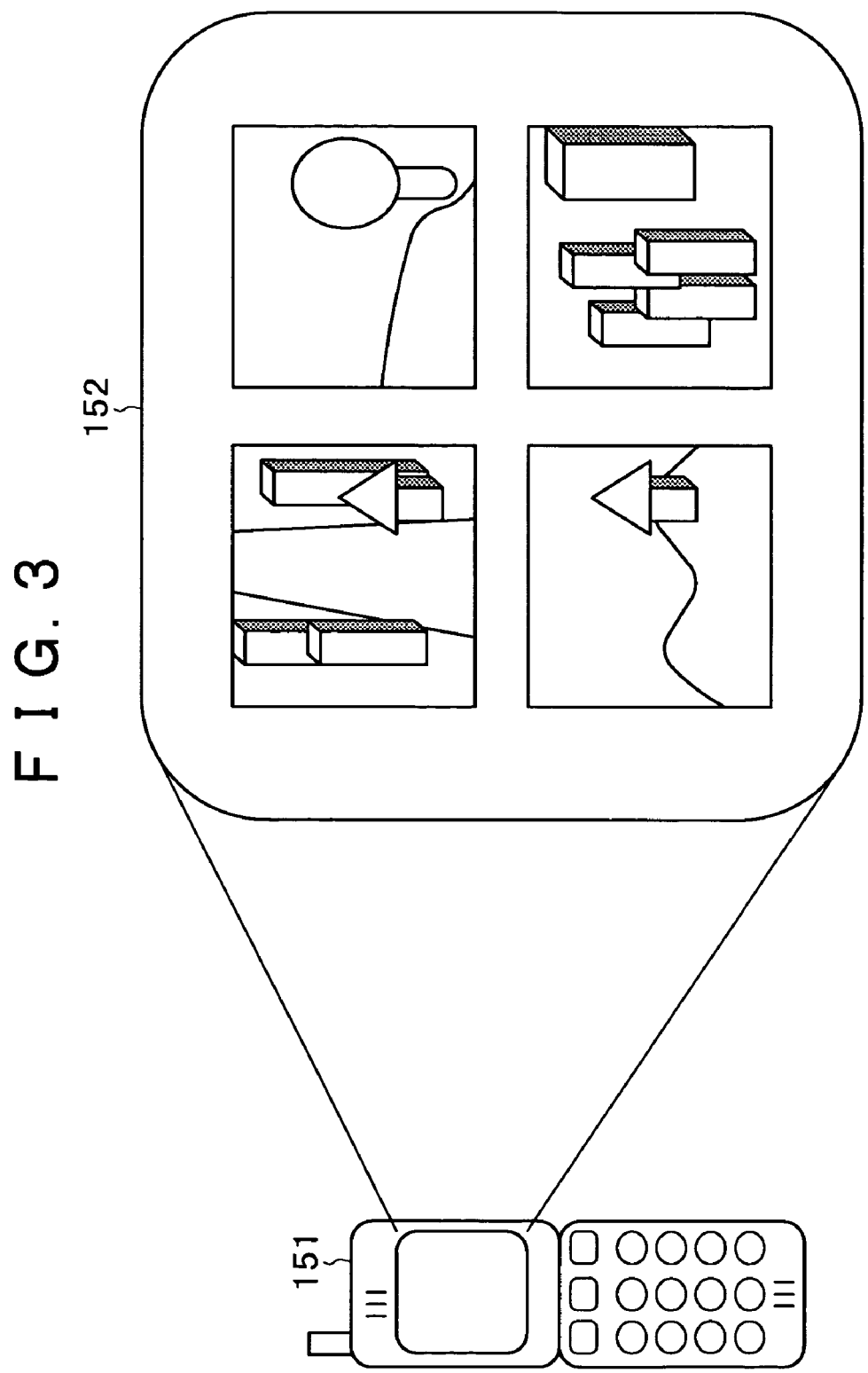
FIG. 3 is a schematic diagram illustrating exemplary image data which are displayed on the information terminal apparatus according to the present invention.

If these number of image data are related with each other, the system control block 101 retrieves all image data on the basis of the search of the image data storage block 107 and outputs the retrieved image data to the display control block 102. The display control block 102 sequentially outputs these image data to the display block 103 or displays these image data as zoom-out images simultaneously on the display block 103. For example, as shown in FIG. 3, the number of image data are displayed in an aligned manner on a display 152 of an information terminal apparatus 151 of the user.

From these number of images, the user selects one through the second input block 106 and displays the selected image on the display block 103 in a zoom-in manner. The control operations for these performances are executed by the input control block 104, the system control block 101, and the display control block 102.

Alternatively, an actually taken panoramic image generated by linking images of two or more directions or an omnidirectional image may be stored in the image data storage block 107 to let the user pan the display image through the second input block 106, thereby displaying an image of a desired direction. In this case, the positional information database 108 stores not each actually taken image data of NSEW in the same positional information but the identifier of one panoramic identifier in a correlated manner.

It should be noted that, as described above, the information terminal apparatus according to the present invention uses known technologies such as the beacon and the GPS as the way for acquiring positional information; therefore, the configurations of the positional information capture device and the positional information format are not limited to the above-mentioned embodiment of the invention.

Figure 4:
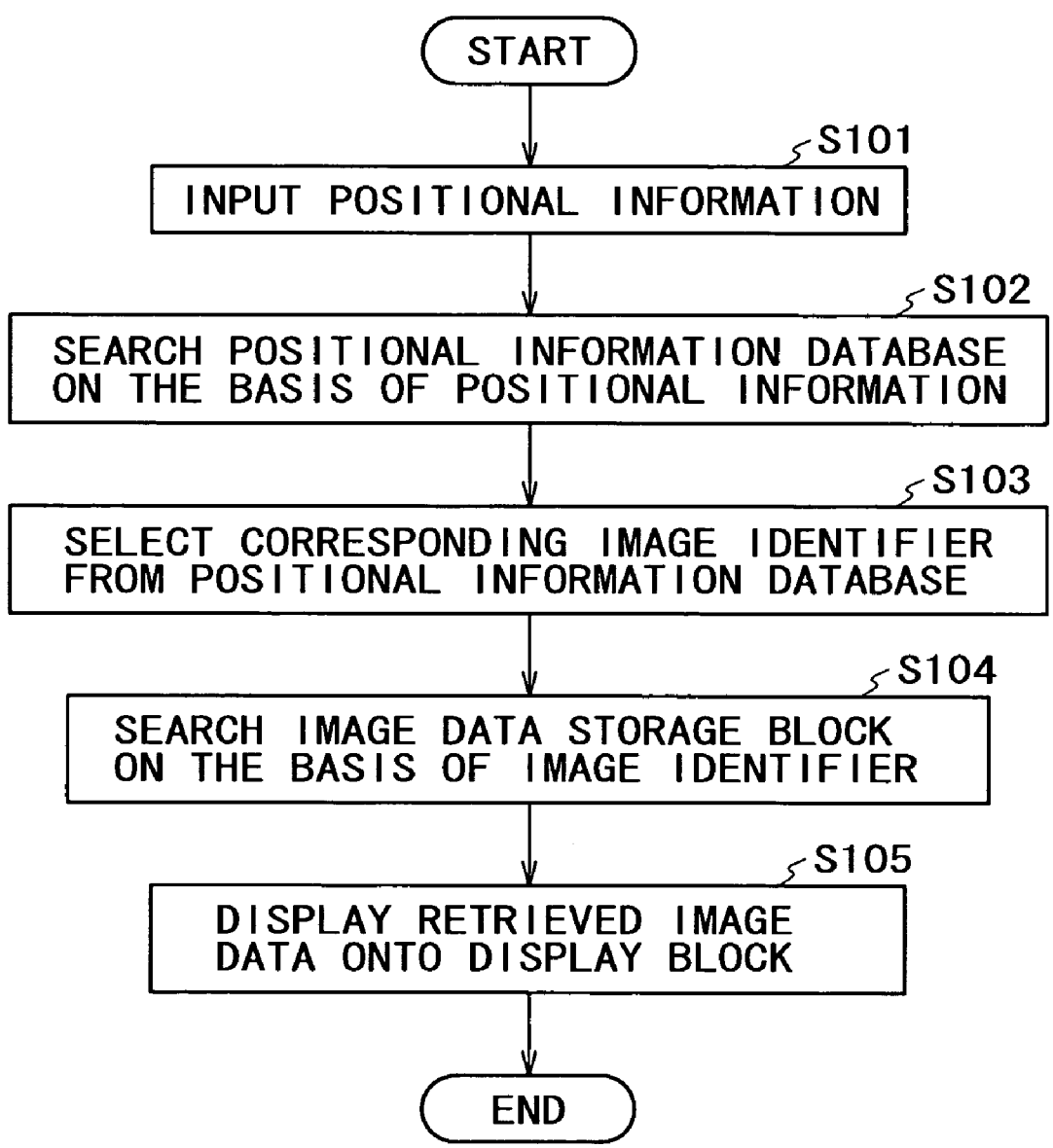
FIG. 4 is a flowchart for describing a processing procedure of the information terminal apparatus according to the present invention.

The following describes a processing procedure to be executed in the information terminal apparatus practiced as Embodiment 1 with reference to the flowchart shown in FIG. 4. The process of each step will be descried along the processing flow shown in FIG. 4. First, in step S101, positional information is entered. This is the positional information associated with latitude/longitude information, for example, which is captured by use of a known technology such as the beacon or the GPS through the positional information capture block 109.

In step S102, on the basis of the captured positional information, the system control block 101 searches the positional information database 108. The positional information database 108 stores positional information (latitude/longitude information) and the identification information of various photographic information stored in the image data storage block 107. In step S103, the system control block 101 retrieves from the positional information database 108 the identification information of the photographic information corresponding to positional information (latitude/longitude information) as a search key or file name for example.

In step S104, the system control block 101 searches the image data storage block 107 on the basis of the identification information of photographic information, a file name, for example, to retrieve the corresponding image data; namely, actually taken image data. In step S105, the system control block 101 displays the retrieved actually taken image data file onto the display block 103 through the display control block 102. It should be noted that in this display processing, compressed image files are decompressed as required.

When the above-mentioned processing has been executed, the display block displays not map information but actually taken image data, namely photographic information, so that the user may compare the photographic information with the actual views around him/her, thereby making confirmation of his/her geographical position. Therefore, this novel configuration allows users, such as children, not having knowledge enough for reading maps to correctly understand their geographical positions.

EMBODIMENT 2

The following describes, as Embodiment 2 of the present invention, an exemplary configuration in which a function of searching for an optimum route from a current position of a user having the information terminal apparatus to a destination is added to the above-mentioned Embodiment 1.

A configuration of an information terminal apparatus practiced as Embodiment 2 is illustrated in FIG. 5. With reference to FIG. 5, components similar to those previous described with reference to FIG. 1 are denoted by the same reference numerals. As shown in FIG. 5, this information terminal apparatus has a system control block 201 for controlling the entire system, a display control block 102 for controlling the data output to a display block 103, the display block 103 based on a display device such as LCD or CRT, a first input block 105 composed of a switch, a button, a dial, and a mouse, for example, a second input block 106, an input control block 104 for controlling the data input from an associated device of the input blocks, an image data storage block 107 for storing images of buildings, roads, and views such as two-dimensional or three-dimensional photographic information, a positional information database 108 storing correlation data between a variety of pieces of photographic information stored in the image data storage block 107 and latitude/longitude information, and a positional information capture block 109 for capturing positional information from the outside.

The processing of the components of Embodiment 2 similar to those of Embodiment 1 shown in FIG. 1 is basically the same as that of Embodiment 1, so that their descriptions will be skipped.

The following describes mainly the differences between Embodiment 1 and Embodiment 2. In Embodiment 2, a user enters a destination through the second input block 106. The destination information includes address data, telephone number data, postal code data, a station name, a place name, or a landmark, for example. A configuration may be provided in which photographic information or map information is presented on a screen to allow the user to specify a destination from the displayed information.

A route detection block 202 gets a user's current position obtained by the positional information capture block 109 and the destination information supplied from the second input block 106 to execute route search processing on the basis of the user's current information and the destination information. The route search processing to be executed by the route detection block 202 is based on known technologies and the route detection block 202 generates and outputs the route information between the two specified geographic points. The output information is passed to the system control block 201 which searches the positional information database 108 by using, as a search key, the positional information in accordance with the outputted route information.

A specific example of this processing will be described with reference to FIGS. 6A and 6B. In FIG. 6A, it is assumed that the user be at current position 301 and the destination be destination 302. In this case, it is assumed that the route detection block 202 have set a route A to B to C to D. The route information includes the information in which the positional information (latitude/longitude) about A, B, C, and D is sequentially arranged. The system control block 201 searches the positional information database 108 on the basis of A, B, C, and D positional information (latitude/longitude).

As described with reference to FIG. 2, the positional information database 108 stores positional information (latitude/longitude) and the identification information of the actually taken image data (photographic image data) at each position. Moreover, as described above, the file identifier shown in FIG. 2 is attached with identification data such as n, w, e, and s indicative of the direction of the data. On the basis of route information, the system control block 201 selects the image data which are seen in the user's heading direction, sequentially arranges the selected images, captures the image data (actually taken image data) corresponding to the identifiers thereof from the image data storage block 107, and outputs the captured identifiers to the display control block 102.

If route A to B to C to D shown in FIG. 6A has been followed, the user sees views in front of him/her in the order of View1, View2, and View3. Advancing in the directions of View1, View2, and View3 at points (for example, intersections), the user can reach destination 302.

Figure 6B:
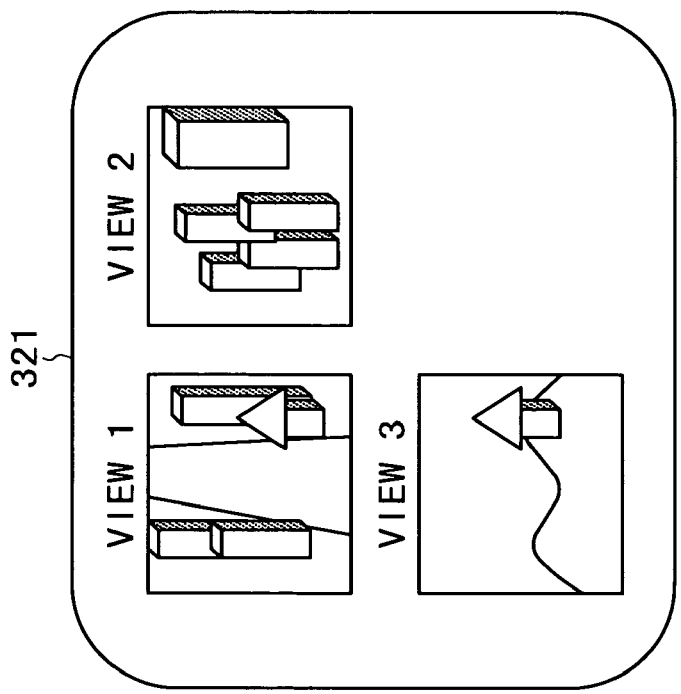
FIGS. 6A and 6B show specific examples of route search processing to be executed in the information terminal apparatus practiced as Embodiment 2.
Figure 6A:
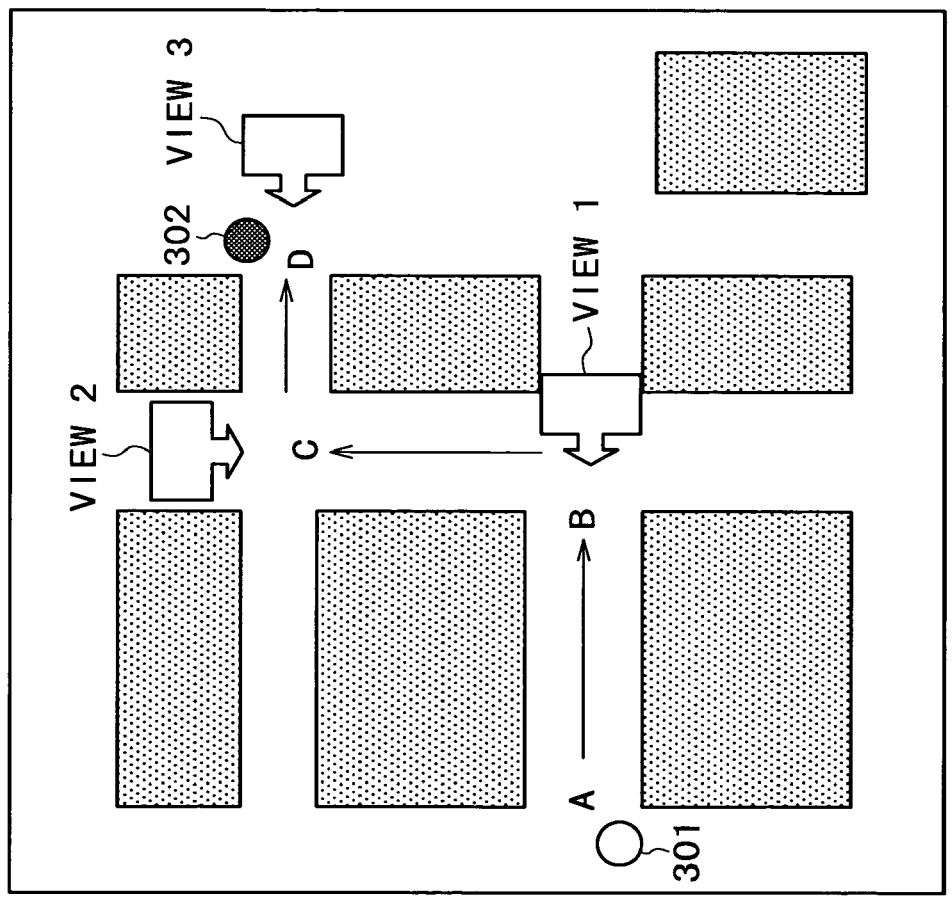

As shown in FIG. 6B, if route A to B to C to D has been followed, the views in front of the user, or the photographic information of View1, View2, and View3 is displayed on the display 321 of the information terminal apparatus owned by the user.

The user compares View1 with the actual view at point A and advances in the direction in which the same view as View1 is seen, thereby reaching point B. At point B, the user compares View2 with the actual view and advances in the direction in which the same view as View2 is seen, thereby reaching point C. At point C, the user compares View3 with the actual view and advances in the direction in which the same view as View 3 is seen, thereby reaching point D, namely destination 302.

Thus, sequentially presenting the actually taken image data in the order of routes allows the user to compare the presented images with the actual views and advance in the direction in which a match is found, thereby reaching the destination. This novel configuration allows users, such as children, not having knowledge enough for reading maps to correctly select routes, easily reaching destinations.

In the above-mentioned example, two or more pieces of actually taken image data along the route are sequentially displayed in the display area of the display device in a certain order at a time. Alternatively, a configuration may be provided in which two or more images are sequentially displayed in a time series manner.

The following describes a processing procedure to be executed in the information terminal apparatus associated with Embodiment 2 with reference to the flowchart shown in FIG. 7. The process of each step will be descried along the processing flow shown in FIG. 7. First, in step S201, positional information is entered. This is the positional information associated with latitude/longitude information, for example, which is captured by use of a known technology such as the beacon or the GPS through the positional information capture block 109.

In step S202, the user enters a destination through the second input block 106. The destination information includes address data, telephone number data, postal code data, a station name, a place name, or a landmark, for example. It should be noted that each item that can be entered must be set identifiable in the route detection block 202.

In step S203, the route detection block 202 gets, through the system control block 201, the current user position obtained by the positional information capture block 109 and the destination information supplied from the second input block 106 to execute route search processing on the basis of the current user position and the destination information.

In step S204, the sequential positional information arranged in the order of routes retrieved by the route search processing on the basis of the current positional information and the destination information is obtained.

In step S205, on the basis of the obtained sequential positional information, the system control block 201 searches the positional information database 108. The positional information database 108 stores positional information (latitude/longitude) and the identification information of various photographic information stored in the image data storage block 107. The system control block 201 gets, in the order of routes, sequential image data (actually taken image data file) at data setting points with directions considered.

In step S206, on the basis of the sequential image data (actually taken image data file) identifiers (for example, file names) at image data setting points, the system control block 201 searches the image data storage block 107 to retrieve the corresponding image data; namely, the actually taken image for each setting points. In step S207, each retrieved actually taken image data file is displayed on the display block 103 through the display control block 102. It should be noted that, in this display processing, compressed image files are decompressed as required.

As shown in FIG. 6B, if the route from the current user position to the destination has been followed, the display images are displayed as the view information (View1, View2, View3, and so on) in front of the user.

By the above-mentioned processing, the display block sequentially displays not map information but actually taken information, namely the actually taken image data in the order of routes, thereby allowing the user to compare the presented images with the actual views only to advance in the direction in which a match is found, reaching the destination. Therefore, this novel configuration allows users, such as children, not having knowledge enough for reading maps to correctly select routes to destination.

Summary of the Processing Sequence

Figure 8:
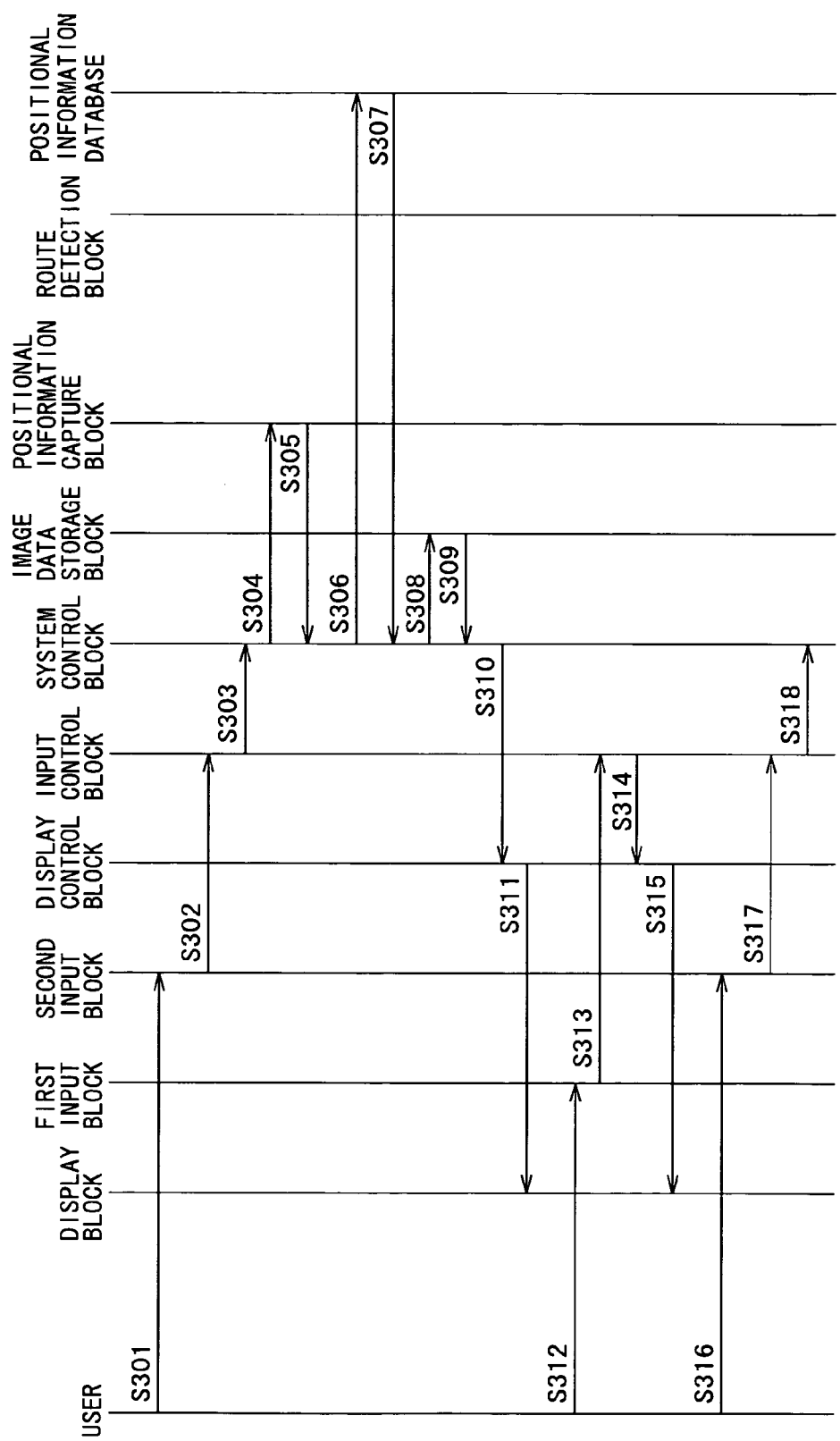
FIG. 8 shows a processing sequence of the information terminal apparatus according to the present invention.
Figure 9:
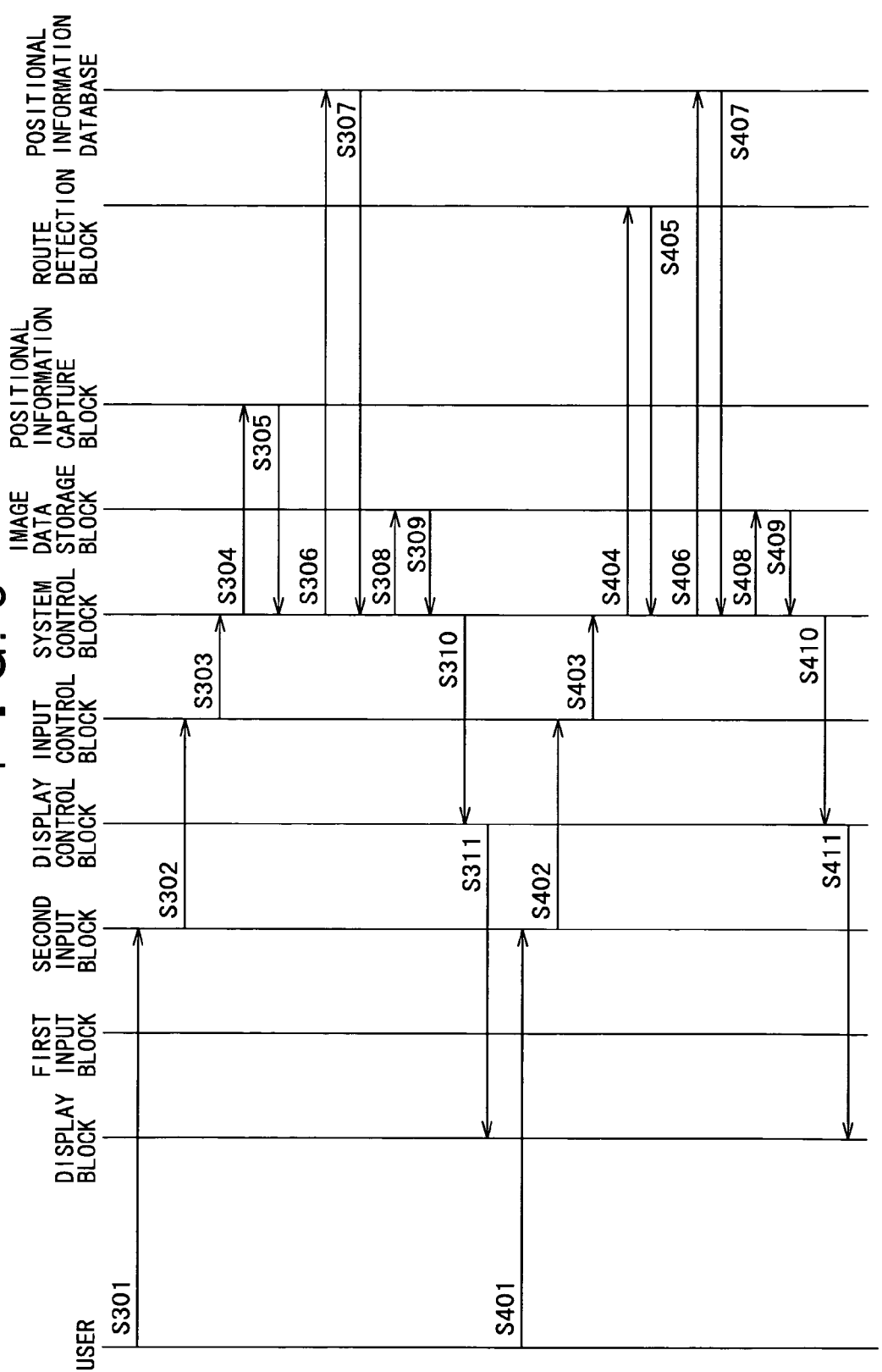
FIG. 9 shows another processing sequence of the information terminal apparatus according to the present invention.

The following summarizes the processing sequence executed in the above-mentioned Embodiments 1 and 2 with reference to FIGS. 8 and 9. These sequence charts are each configured by four subsets; system activation, display angle adjustment, navigation function initialization, and in-transit navigation function. The description will be made in this order below.

The system activation starts when the user presses the second input block of the information terminal apparatus (step S301). The operation (S301) of pressing the second input block is identified as a start command. This information is transmitted to the input control block in step S302. In step S303, this information is transmitted to the system control block.

Receiving the start command, the system control block requests the positional information capture block for the current position in step S304. By use of a known technology such as the beacon or the GPS, the positional information capture block gets the positional information such as latitude/longitude information. The obtained positional information is supplied to the system control block in step S305.

In step S306, on the basis of the positional information such as latitude/longitude information, the system control block searches the positional information database. As described with reference to FIG. 2, the positional information database stores the identifiers of the image data (photographic information) corresponding to the positional information such as latitude/longitude information. In step S307, the system control block gets the identifiers of the image data (photographic information) corresponding to the positional information such as latitude/longitude information.

In step S308, on the basis of the identifiers of the image data (photographic information) corresponding to the positional information such as latitude/longitude information, the system control block searches the image data storage block for the image data files corresponding to these identifiers.

In step S310, the system control block outputs the obtained image data files to the display control block in which data decompression and display mode setting, for example, are executed. In step S311, the display control block outputs the processing results to the display block to display the image data (photographic information).

Next, in step S312, the user operates the first input to enter various display mode setting requests such as image selection, zoom setting, and display angle adjustment. The request information is supplied to the input control block and the display control block in steps S313 and S314. In the display control block, the processing for executing the requested display processing is executed. In step S315, the processed image data are displayed on the display block.

Repeating the operations in steps S312 through S315 by the required number of times allows the user to display the images required by him/her or the information matching the direction in which the user is heading, for example. In the above-mentioned embodiments, the input controller directly drives the display controller. Alternatively, an installation is possible in which control information is provided through the system control means. The user who has changed the display information to the same direction as a view seen in the real world finally presses the second input in steps S316 through S318, upon which a command of ending the display image adjustment is transmitted to the system control block through the input control block.

The following describes a display processing sequence of displaying sequential image data along route on the basis of the route detection in accordance with the above-mentioned Embodiment 2.

Referring to FIG. 9, steps S301 through S311 are indicative of the image data display processing sequence based on user's positional information after the activation processing described with reference to FIG. 8; therefore, the description of these steps will be skipped. The processing sequence from entering a destination by the user who has understood his/her current position to displaying the image data along the route is the processing of steps S401 through S411.

In step S401, the user operates the second input block to enter his/her destination. Entered here are address data, telephone number data, postal code data, a station name, a place name, or a landmark, for example. The input information is supplied to the input control block and the system control block in steps S402 and S403.

In step S404, the system control block outputs the obtained user's current position and the destination information entered through the second input block to the route detection block. The route detection block executes route search processing on the basis of the user's current positional information and the destination information. In step S405, the route detection block outputs the sequential positional information arranged in the order of the routes retrieved by the route search processing based on the current positional information and the destination information to the system control block.

In step S406, the system control block outputs the obtained sequential positional information to the positional information database. In step S407, the system control block gets a sequential image data (actually taken image file) identifier for each image data setting point from the positional information database.

In step S408, the system control block searches the image data storage block on the basis of the sequential image data (actually taken image file) identifier (for example, a file name) for each image data setting point to get the image data; namely, the actually taken image information for each setting point in step S409. In steps S410 and S411, the obtained actually taken image information file is displayed to the display block through the display control block.

The image displayed at this moment is indicative of the view information in front of the user if the route from the user's current position to the destination has been followed as described before. For example, the actually taken image data View1, View2, View3, and so on shown in FIG. 6B are displayed. By advancing in the direction in which the displayed image matches the actual view, the user can reach the destination.

EMOBODIMENT 3

Figure 10:
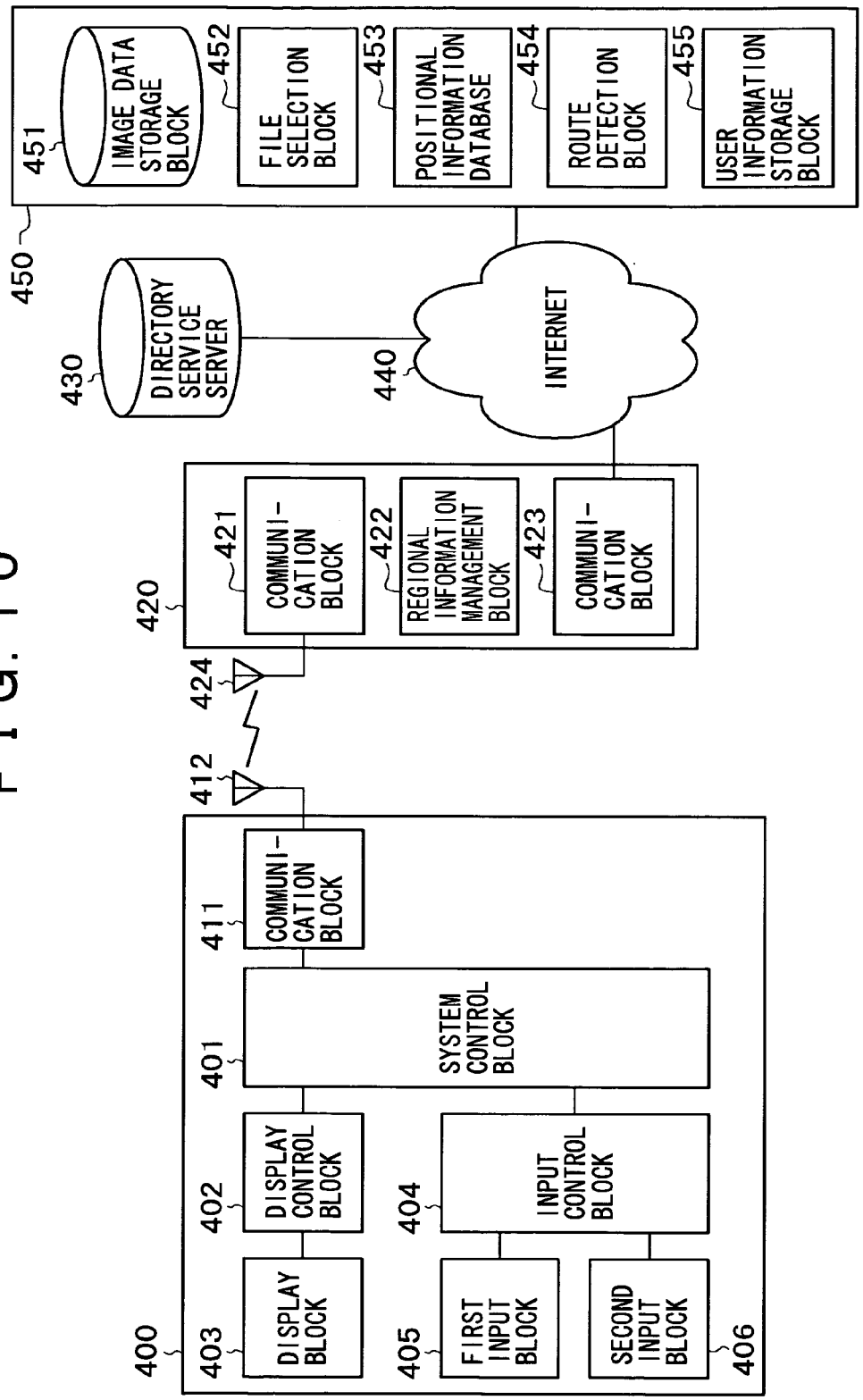
FIG. 10 is a schematic diagram illustrating a network configuration of an information terminal apparatus practiced as Embodiment 3 of the present invention.

The following describes, as Embodiment 3, an exemplary configuration which uses a network function for enhanced user convenience. FIG. 10 shows an exemplary system configuration associated with Embodiment 3.

As shown in FIG. 10, there are arranged an information terminal apparatus 400 which is carried on a user, a wireless base station 420 for executing a communication and relay processing, a directory service server 430 for executing directory services, and a service provider server 450 for executing navigation services for the user. The wireless base station 420, the directory service server 430, and the service provider server 450 can communicate with each other through the Internet 440. Between the information terminal apparatus 400 and the wireless base station 420, wireless communication is carried out through an antenna 412 and an antenna 424, respectively. In the example shown in FIG. 10, the Internet is used as a communication network; alternatively, other communication networks, such as a public switched line network, may be used.

The information terminal apparatus 400 carried on the user has a system control block 401 for controlling the system in its entirety, a display control block 402 for controlling the output of data to a display block 403, the display block 403 constituted by a display device such as LCD or CRT, a first input block 405 composed of a switch, a button, a dial, and a mouse, for example, a second input block 406, an input control block 404 for controlling the data input from an associated device of the input blocks, a communication block 411 capable of performing wireless communication, and an antenna 412. Unlike Embodiments 1 and 2, the information terminal apparatus 400 of Embodiment 3 does not have an image data storage block and a positional information database. Instead, the information terminal apparatus 400 of Embodiment 3 captures the image data and the positional information from the outside through the communication block 411.

The wireless base station 420 has an antenna 424 and a communication block 421 for the data communication with the communication block 411 of the information terminal apparatus 400 through the antenna 412. The wireless base station 420 also has a regional information management block 422, and a communication block 423 for executing communication through the Internet 440.

The regional information management block 422 manages the positional information of the wireless base station 420 itself, the service capabilities provided by the wireless base station capability, one or more pieces of user terminal information during communication, the positional information about the installation of the wireless base station, and other region-associated information and executes control over the communication with the directory service server 430 on the network and other service groups.

Receiving a positional inquiry or a request for getting route information from the user's information terminal apparatus, the regional information management block 422 of the wireless base station 420 transmits the received inquiry or route information to the service provider server 450, with its own positional information (latitude/longitude) stored in the regional information management block as the position of the user's information terminal apparatus. This processing allows the user's information terminal apparatus to eliminate the necessity for having the position detecting capabilities such as the GPS, thereby reducing the size and cost of the apparatus.

The directory service server 430 concentratedly manages the information about the functional blocks communicating each other via a network, among the elements constituting the present invention. The service provider server 450 has an image data storage block 451, a file selection block 452, a positional information database 453, a route detection block 454, and a user information storage block 455. The service provider server 450 is a set of the functional blocks which provide services via a network. These functional blocks may physically reside at one place or in the same host or installed on separate subnets in a distributed manner.

Like the image data storage block 451 of the information terminal apparatus described with Embodiments 1 and 2, the image data storage block 451 of Embodiment 3 stores the information about buildings, roads, and views as two-dimensional or three-dimensional photographic information. The positional information database 453 stores the correlation data between various photographic information stored in the image data storage block 451 and latitude/longitude information. The file selection block 452 gets the positional information of the user's information terminal apparatus from the wireless base station 420 via a network, searches the positional information database 453 for the corresponding image data identifiers on the basis of the retrieved positional information, gets various photographic information from the image data storage block 451 on the basis of the retrieved image data identifiers, and sends the various photographic information to the user's information terminal apparatus.

The route detection block 454 gets user's current position and destination information through a network and executes route search processing on the basis of the user's current positional information and destination information. It should be noted that the positional information of the wireless base station is used for user's current position and user's input information is used for the destination information. The route search processing to be executed by the route detection block 454 is based on known technologies and the route detection block 454 generates and outputs the route information between two specified points. The output information is passed to the file selection block 452 which searches the positional information database 453 on the basis of the outputted route information with the positional information according to the route used as a search key, gets the identifiers of the images along the route, gets various photographic information stored in the image data storage block 451 as the sequential image data along the route on the basis of the obtained image identifiers, and sends the obtained various photographic information to the user's information terminal apparatus.

In the route detection processing, the file selection block 452 gets two or more image data identifiers corresponding to two or more pieces of positional information from the positional information database 453 on the basis of two or more pieces of positional information on the route based on the route information obtained from the route detection block 454, gets two or more actually taken image data according to the route from the image data storage block 451 on the basis of the obtained two or more image data identifiers, and generates data which can be displayed sequentially all in one screen or sequentially each at different times from the two or more actually taken image data along the route. The data thus generated are sent to the information terminal apparatus 400.

In Embodiment 3, the image file selection capability installed in the user's information terminal apparatus is made independent for each network, thereby executing file selection and display control processing while executing cooperation between the user's information terminal apparatus 400 and the regional information management block 422 of the wireless base station 420.

The user information storage block 455 of the service provider server 450 stores user identifiers and user preference information in a correlated manner. Consequently, a configuration may be provided in which, when the service provider server 450 receives a positional information acquisition request or a route search request from the user, user's current position, destination, or restaurant information along the route, for example, are selected according to user preference and restaurant positions are presented to the user along with the image data to be presented to the user.

Configuration of the Information Terminal Apparatus

Figure 11:
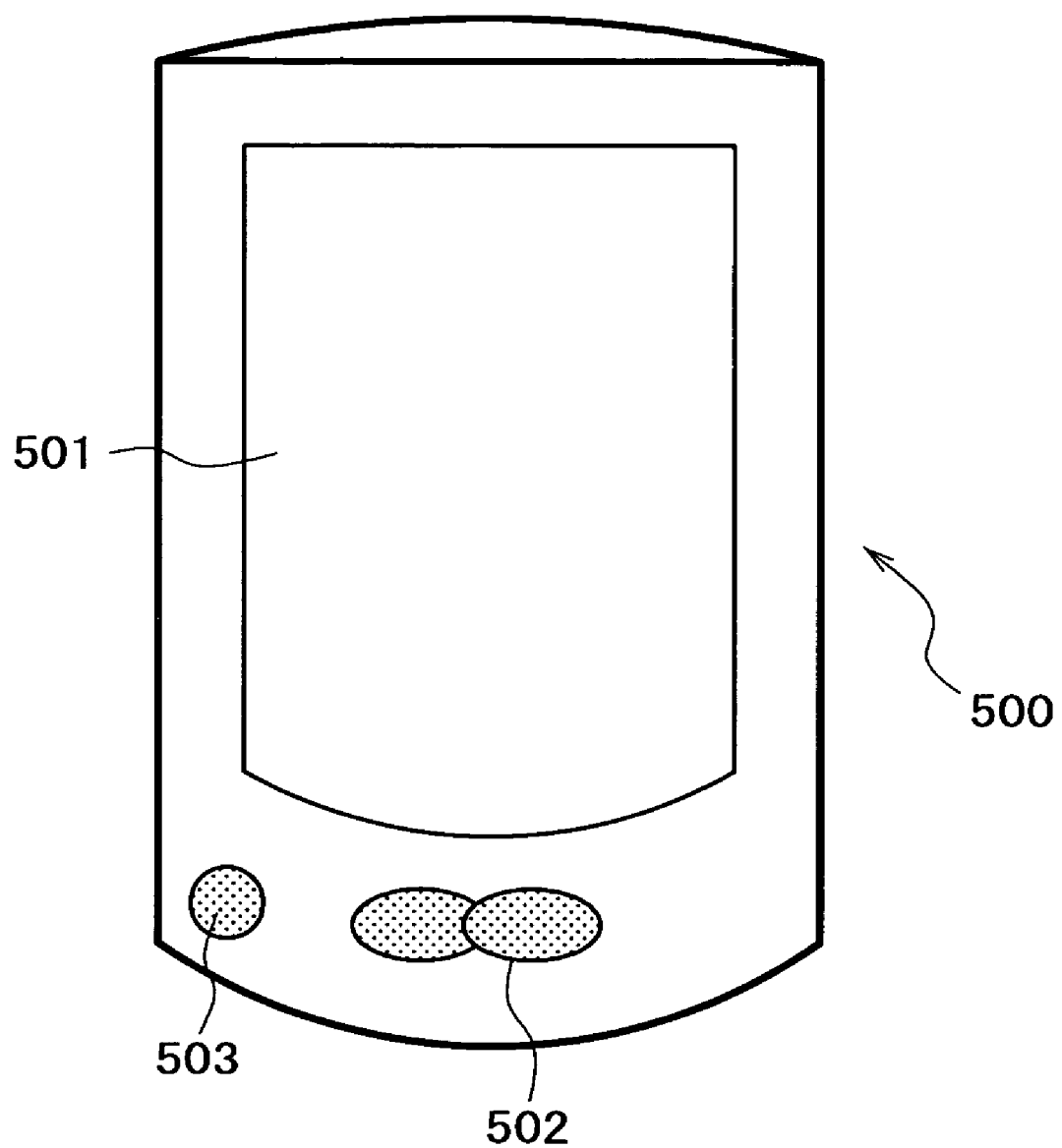
FIG. 11 is a schematic diagram illustrating an external configuration of the information terminal apparatus according to the present invention.
Figure 12:
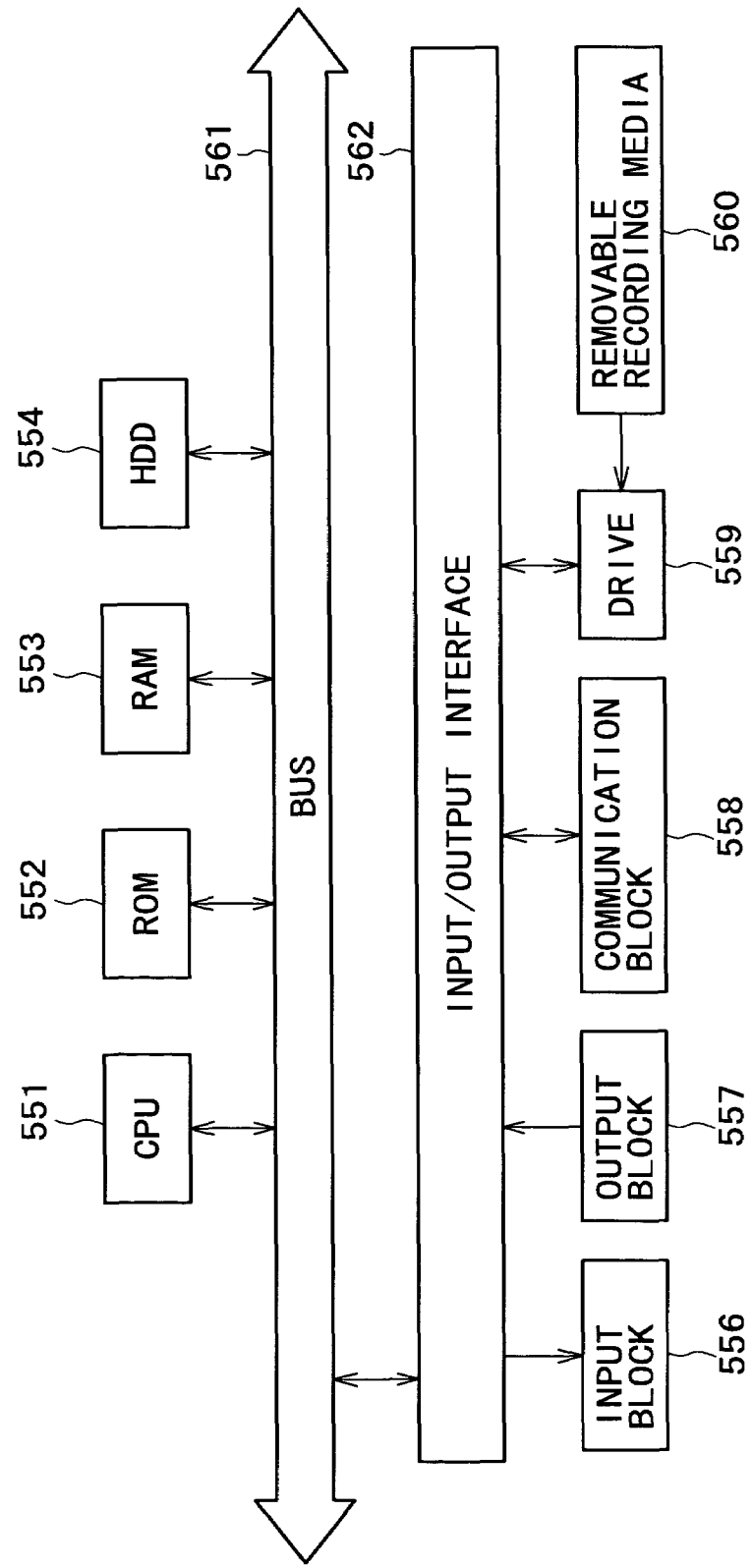
FIG. 12 is a block diagram illustrating an exemplary hardware configuration of information terminal apparatus according to the present invention.

The following describes a configuration of the information terminal apparatus which is carried on a user with reference to FIGS. 11 and 12. FIG. 11 shows an exemplary external view of the information terminal apparatus and FIG. 12 shows an exemplary hardware configuration thereof.

Referring to FIG. 11, an information terminal apparatus 500 has a display block 501 on which image information selected from an image data storage block is displayed under the control of a system control block and a display control block. The image information is a two-dimensional or three-dimensional actually taken image, its display angle being changeable as desired through a first input block 502. The first input block 502 is a rocker switch, for example. In this example, turning the rocker switch to the right results in horizontal right-side panning and turning it to the left results in horizontal left-side panning. If a provided image file is a panoramic image having an field angle of 360 degrees, turning the rocker switch to one side and holding it for a while cycles the displayed image to the original position.

A second input 503 is used to inform the system control block of the starting of the use of information display capabilities and the end of position adjustment.

The following describes an exemplary hardware configuration of the information terminal apparatus with reference to FIG. 12. A CPU (Central Processing Unit) 551 is a processor for executing various programs functioning as controller. A ROM (Read Only Memory) 552 stores the programs to be executed by the CPU 551 or fixed data which are calculation parameters. A RAM (Random Access Memory) 553 provides a storage area and a work area for the programs to be executed by the CPU 501 and the parameters which change from time to time in program execution.

A HDD 554 executes hard disk control, storing various data and programs into a hard disk and reading them therefrom. A bus 561 is constituted by a PCI (Peripheral Component Internet/Interface), for example, transferring data with each module and each input unit through an input/output interface 562.

An input block 556 is composed of various input buttons, a keyboard, and a pointing device, for example. In this example, the first input block and the second input block described with the above-mentioned embodiments are shown as one input block. When the input block 556 is operated or data are received from a communication block 558, a corresponding command is inputted in the CPU 551, executing a corresponding command stored in the ROM 552. An output block 557 is constituted by a CRT or a liquid crystal display, for example, displaying various information in a text or image form.

Under the control of the CPU 551, the communication block 558 executes communication with various devices, sends data supplied from various storage units or processed by the CPU 551 and receives data from other devices.

A drive 559 executes recording/reproducing of a removable recording medium 560 such as flexible disc, CD-ROM (Compact Disc Read Only Memory), MO (Magneto Optical) disk, DVD (Digital Versatile Disc), magnetic disc, or semiconductor memory, reproducing programs and data supplied from each removable recording medium 560 and storing programs and data into the removable recording medium 560.

When a program or data are read from each recording medium for the execution or processing by the CPU 551, these program and data are supplied to the RAM 553 connected through the input/output interface 562 and the bus 561, and the CPU 551 executes various processing operations in accordance with the program loaded in the RAM.

It should be noted that a sequence of processing operations described herein may be executed by hardware, software, or a combination of both. In the execution of software, programs in which processing sequences are coded are loaded in a memory of a computer built in a dedicated hardware unit and the loaded programs are executed or these programs are installed in a general-purpose computer which can execute various processing operations.

For example, programs may be recorded to a hard disk or the ROM which are recording media in advance. Alternatively, programs may be stored (or recorded) temporarily or permanently in any of removable recording media such as flexible disc, CD-ROM (Compact Disc Read Only Memory), MO (Magneto Optical) disk, DVD (Digital Versatile Disc), magnetic disc, and semiconductor memory. Such removable recording media can be provided as so-called packaged software.

It also should be noted that, in addition to the above-mentioned installation of programs from removable recording media to computers, programs may be wirelessly transferred from a download site to the computer or transferred via a LAN (Local Area Network) or the Internet in a wired manner to the computer in which the received programs are stored in built-in recording medium such as a hard disk.

It further should be noted that various processing operations described herein may be executed not only in a time dependent manner but also concurrently or individually in accordance with the processing performance of the processing apparatus or on an as required basis.

Although the present invention has been described with reference to specific embodiments, those of skill in the art will recognize that changes may be made thereto without departing from the spirit and scope of the present invention as set forth in the hereafter appended claims.

The invention claimed is:

1. A navigation system for providing positional information through a network, comprising:
a server for providing positional information, an information terminal apparatus for receiving positional information, and a base station for executing communication and relay processing between the server and the information terminal apparatus; wherein
the server includes an image data storage block storing actually taken image data at a plurality of geographic points in an area for which positional information is provided, a positional information database storing correlation data between an identifier of image data stored in the image data storage block and positional information, and a file selection block for executing processing of obtaining, based on positional information received through the base station, an image data identifier corresponding to the positional information from the positional information database and obtaining actually taken image data from the image data storage block based on the obtained image data identifier;
the base station includes a regional information management block for managing information including the positional information of itself and, based on an inquiry for a position from the information terminal apparatus, executing processing of transmitting positional information stored in the regional information management block to the server; and
the information terminal apparatus includes a communication block for transmitting a positional inquiry to the base station and receiving actually taken image data obtained based on the positional information in the server, and a display block for displaying the actually taken image data.

2. A navigation system according to claim 1, wherein:
the actually taken image data stored in the image data storage block of the server is an actually taken panoramic image corresponding to the positional information; and
the information terminal apparatus includes an input block through which processing of changing a display area of the panoramic image displayed on the display block occurs.

3. A navigation system according to claim 1, wherein:
the actually taken image data stored in the image data storage block of the server are actually taken image data in a plurality of directions corresponding to the positional information;
the file selection block executes, based on the positional information, processing of selecting the actually taken image data in a plurality of directions corresponding to the positional information; and
the information terminal apparatus includes an input block through which the actually taken image data in the plurality of directions to be displayed on the display block are selectively displayed.

4. A navigation system according to claim 1, wherein:

the server further includes a route detection block for executing route search processing; and the file selection block of the server executes, based on a plurality of pieces of positional information along a route based on route information obtained from the route detection block, processing of obtaining a plurality of image data identifiers corresponding to the plurality of pieces of positional information from the positional information database, obtaining a plurality of actually taken image data along a route from the image data storage block based on the obtained plurality of image data identifiers, and generating data for displaying the plurality of actually taken image data along the route in one of a sequential parallel manner and a sequential manner.

5. A navigation system according to claim 1, wherein:

the regional information management block of the base station stores latitude and longitude information of itself;

the positional information database of the server stores correlation data between an identifier of image data identifier stored in the image data storage block and the latitude and longitude information as positional information; and the file selection block executes, based on the latitude and longitude information obtained from the base station, processing of obtaining the image data identifier corresponding to the latitude and longitude information from the positional information database.

* * * * *